July 24, 1923.
C. C. HANSON ET AL
1,462,696
EXPANSION VALVE
Original Filed May 21, 1921
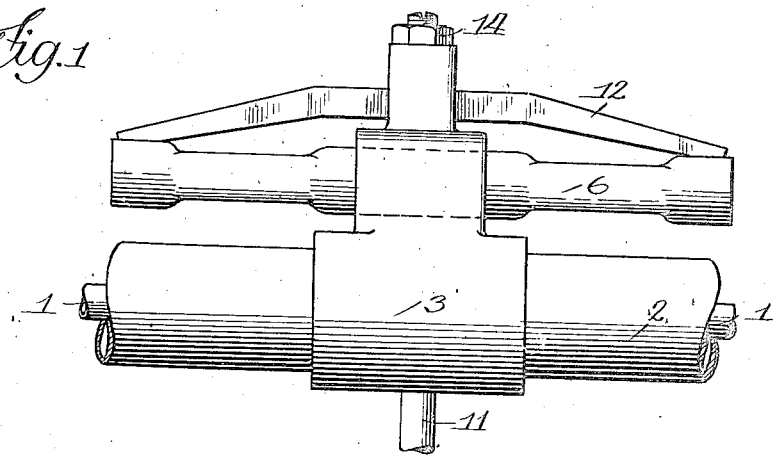
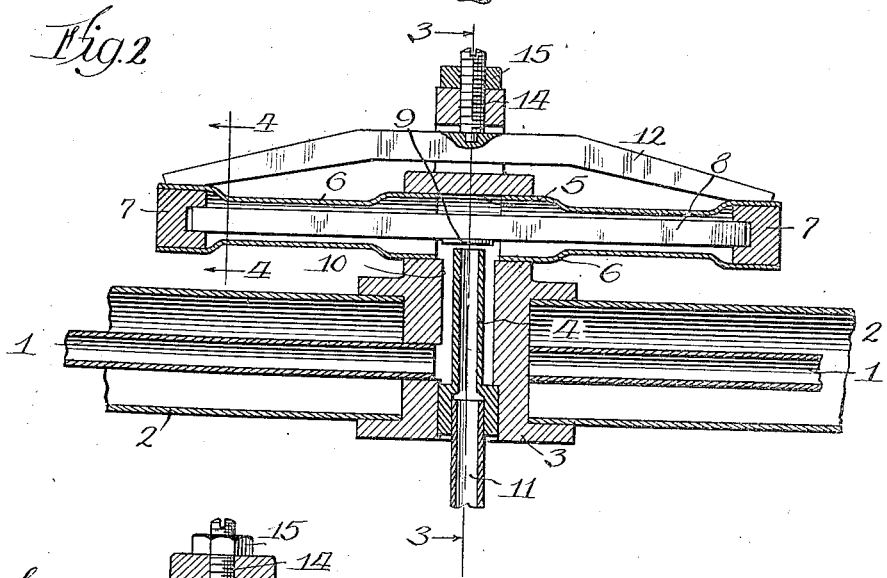
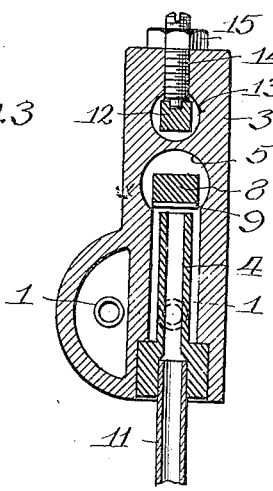
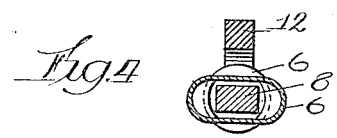
Inventors:
Charles C. Hanson
and John Twardowsky
by Albert Scheible
Attorney Patented July 24, 1923.

1,462,696

UNITED STATES PATENT OFFICE.

CHARLES C. HANSON AND JOHN TWARDOWSKY, OF CHICAGO, ILLINOIS, ASSIGNORS, BY MESNE ASSIGNMENTS, TO UNIVERSE CORPORATION, OF CHICAGO, ILLINOIS, A CORPORATION OF ILLINOIS.

EXPANSION VALVE.

Application filed May 21, 1921, Serial No. 471,433. Renewed February 8, 1923.

*To all whom it may concern:*

Be it known that we, CHARLES C. HANSON, a citizen of the United States, and JOHN TWARDOWSKY, a citizen of Russia, both residing at Chicago, in the county of Cook and State of Illinois, have invented certain new and useful Improvements in an Expansion Valve; and we do hereby declare the following to be a full, clear, and exact description of the invention, such as will enable others skilled in the art to which it appertains to make and use the same.

Our invention relates to valves and in one of its general aspects aims to provide a valve construction in which the position of the valve member can readily be varied by means disposed entirely outside of the casing of the valve, thereby permitting such an adjustment to be made without danger of leakage and without employing a stuffing box or packing of any kind.

More particularly, our invention relates to expansion valves suitable for use as parts of refrigerating systems and aims to provide a simple, inexpensive, compact and easily adjusted type in which the valve opening can readily be adjusted so as to vary the effective throttling action while maintaining the valve casing permanently sealed. In this aspect, our invention aims to provide an expansion valve construction in which no elements whatsoever extend movably through the valve casing and which therefore will require no stuffing box or packing of any kind. It also aims to provide a construction in which the desired adjusting movement can readily be imparted to the movable member of the valve while maintaining this member in such a relation to the cooperating port as to insure a uniform spacing of the associated parts, thereby securing the passing of the compressed gas or liquid past the valve member in a film of uniform thickness.

In another aspect, our invention aims to provide a valve in which one of the two relatively movable members is supported from the casing of the valve and is adapted to be moved by a suitable flexing of the casing, and in this aspect our invention aims to provide a flexible casing adapted by its resiliency to move the movable valve member in one direction; also, to provide cooperating means disposed externally of the casing for flexing this casing and thereby moving the said member in the opposite direction.

More particularly, our invention aims to provide a valve in which the movable or closure member is supported within a flexible casing by rigid means extending across the casing, aims to provide a simply and easily manufactured construction for such a casing, and aims to provide simple means for applying a symmetrically distributed flexing pressure to the same. Furthermore, we aim to provide an arrangement for this purpose in which metal tubing may be effectively used for the flexible casing, and aim to employ a construction requiring only simple machining operations for the manufacture of the valve. Still further and also more detailed objects will appear from the following specification and from the accompanying drawings, in which Fig. 1 is a front elevation of an expansion valve embodying our invention.

Fig. 2 is a longitudinal and central vertical section through the same.

Fig. 3 is a vertical section taken along the center line of Fig. 2.

Fig. 4 is a horizontal section taken along the correspondingly numbered line in Fig. 3.

In one of its highly commercial aspects, our invention relates to an expansion valve suitable for use as a part of a mechanical refrigerator for household use, such as the one for which certain other important features are shown in our copending application No. 479752, filed June 23, 1921, on a refrigerating system. In the arrangement of the said copending application, the tube 1 through which the compressed gas is fed to the expansion valve is cooled by the expanded gas returning to the compressor through a tube 2 which surrounds the said tube 1, the tube 1 being desirably doubled back upon itself within the tube 2 after the manner disclosed in the said copending application so as to increase the surface exposed to the cooling action of the gas in the outer tube 2. Both of the said tubes may desirably be supported by a casting 3 arranged as shown in Figs. 2 and 3, which casting forms the support for all parts of our valve. Fastened within a vertical bore in the support 3 is an outlet tube 4 which has its main portion laterally spaced from the wall of the said bore so as to afford a passage through which the compressed gas flowing from the inlet tube 1 may pass to the upper or free end of the outlet tube 4.

This free end of the outlet tube 4 extends into a transverse bore 5 in the casting 3, so that the extreme tip of the tube is disposed between the adjacent ends of a pair of tubes 6 which tightly fit into the bore 5 and are soldered into the latter. Each of the tubes 6 has its outer end sealed by a plug 7 and the opposed ends of the two plugs 7 are recessed to form supports for the ends of a stiff carrier bar 8 which extends longitudinally of the tubes 6 both through these tubes and through the transverse bore 5 in the casting, and which carrier bar is freely spaced from the bore of the tubes 6. Secured to the lower face of the bar 8 is a disk 9, which disk is larger in diameter than the outlet tube 4 and is disposed close to the tip of the latter, both the tube 4 and the disk 9 being preferably made of non-corrosive metal.

Thus arranged, it will be obvious that the distance between the tip of the tube 4 and the disk 9 controls the passage of fluid from the main bore 10 of the tubular casting 3 (which casting forms the outer or inlet tube of the valve) to the inner or outlet tube 4 of the valve, the said outlet tube being connected to the piping 11 of the refrigerator system. Consequently, by varying the distance between the disk 9 and the tip of the tube 4, the passage of the fluid can be suitably throttled so as to control the rate of expansion of the fluid. To move the closure disk 9 for this purpose, we construct the tubes 6 of a flexible and resilient material, such as copper tubing and preferably flatten each of the tubes in its medial portion after the manner shown in Figs. 2 and 4 so as to increase its flexibility under strains applied vertically at the end of the tube. These tubes taken together constitute a flexible casing or tube. To apply such a strain in a downward direction, we provide a yoke or stirrup 12 secured at its ends to the opposite ends of the two tubes 6 and extending through a bore 13 in the casting 3. Threaded into the top of this casting 3 is an adjusting screw 14 having its tip in engagement with the middle of the yoke 12, this adjusting screw being desirably in coaxial alinement with the disk 9 and the outlet tube 4 and desirably having a lock nut 15 threaded upon it for preventing any jarring of the valve as a whole from changing the adjustment.

With the tube, yoke, and associated parts constructed as just described, and with the outlet tube 4 terminating at a considerable distance from the closure disk 9 when the flexible tubes 6 are not under strain, it will be evident from Fig. 2 that there will be a free opening from the bore of the valve member into the outlet tube so that the compressed liquid entering the inlet bore 10 through the tube 1 could flow rapidly into the outlet tube 4. By suitably adjusting the screw 14, the yoke 12 can be moved downward to any desired extent so as to approach the closure disk 9 suitably to the tip of the outlet tube 4, thereby effecting the throttled rate of flow desired for insuring the expansion of the compressed liquid within the tube 4 or at least within the adjacent part of the piping 11. By making the bar 8, the tube 6 and the yoke 12 symmetrical with respect to the common axis of the outlet tube 4 and the closure disk 9 and by applying pressure to the yoke through the screw 14 coaxial with the said parts, we can readily balance the strains on the two tubes, so as to maintain the closure disk 9 continuously parallel to the mouth of the tube 4. We can therefore secure a very sensitive and accurate adjustment of the operative part of the expansion valve with an exceedingly simple construction and one that is not likely to stick or to get out of order. Furthermore, it will be evident from the drawings that we accomplish our purposes with relatively few, inexpensive, and easily machined parts in which the various joints can readily be sealed by soldering or brazing and in which the adjustment is made without employing any parts extending adjustably from the outside into the passages through which the fluid flows.

By using a metal outlet tube 4 mounted concentrically within the bore 10 of the casting 3 and admitting the compressed fluid to the valve casing through the annular space between the tube 4 and the wall of the said bore, we provide a valve casing with concentric ports and cause the fluid to flow along both the interior and the exterior of the tube 4. Consequently, since the drop in temperature of the expanding gas lowers the temperature within the outlet tube 4, this tube will take heat from the fluid surrounding the tube, thereby cooling the fluid fed past the exterior of the tube towards the closure disk 9. By thus reducing the temperature of the compressed fluid before permitting the latter to expand, we can considerably reduce the temperature obtained in the expansion coils to which the outlet tube 4 leads. The valve of our invention therefore lends itself particularly for use as a part of the highly efficient refrigerating system disclosed in our above mentioned copending application.

It will also be noted that the yoke 12, the plugs 7 and the carrier bar 8 taken together substantially form a rigid loop extending through the flexible valve casing; and that the adjustment is made by flexing the casing while maintaining this loop rigid. By forming the upper part of the supporting casting into a bracket overhanging the said elongated casing we can readily secure the desired alined mounting for the adjusting screw 14, and by flattening the tube portions in planes parallel to the mouth of the controlled port we avoid any twisting which might interfere with the desired uniform throttling of the fluid at the mouth of this port.

However, while we have illustrated and described our invention as embodied in a form having highly desirable features of arrangement, we do not wish to be limited to the details of the construction and arrangement here disclosed, nor to the particular materials mentioned, nor to the particular uses above named, it being obvious that various changes or modifications might be made in all of these respects without departing from the spirit of our invention or from the appended claims.

Neither do we wish to be limited to the use of our invention in connection with refrigerating systems or as an expansion valve, it being evident that in its broad aspects it presents a valve having its seat disposed for approach or engagement with a closure element mounted on a rigid carrier, this carrier being bodily movable by flexing the resilient casing which houses both the valve seat (viz. the mouth of the outlet tube 4) and the closure element. In this connection, it will be noted that by making the tubular casing symmetrical with respect to the valve seat and extending at right angles to the latter, we can readily move both ends of the casing simultaneously and equally. Consequently the movement of the closure element is axial of the valve seat and this element can be attached rigidly to the carrier 8, thereby permitting a simple and cheap construction.

We claim as our invention:—

1. The combination with a valve body having concentric inlet and outlet tubes, of a closed casing of resilient material having a lateral aperture alining with the said tubes, a rigid carrier housed by the casing and secured to the ends thereof, a closure element mounted on the carrier and disposed opposite the mouth of one of the said tubes, and means for simultaneously moving both ends of the casing with respect to the valve body so as to flex the casing, thereby moving the carrier so as to cause the closure element to approach the said tube mouth.

2. A valve comprising a supporting member having two ports, a hollow flexible member whose bore affords the connection between the two ports, a stiff member carried and housed by the flexible member and having a closure portion disposed for closing one of the ports when the flexible member is suitably flexed, and means threaded upon the supporting member and operable from outside the flexible member for flexing the latter so as to move the closure portion with respect to the port adjacent thereto.

3. The combination with a valve body having concentric inlet and outlet tubes, of a closed casing of resilient material having a lateral aperture alining with the said tubes, a rigid carrier housed by the casing and secured to the ends thereof, a closure element mounted on the carrier and disposed opposite the mouth of one of the said tubes, and means for simultaneously moving both ends of the casing with respect to the valve body so as to flex the casing, thereby moving the carrier so as to cause the closure element to approach the said tube mouth, and adjustable means for maintaining the casing in such flexed disposition to hold the closure element at a predetermined distance from the said tube mouth.

4. The combination with a valve body having an inlet and an outlet and having a seat associated with the outlet, of a tubular casing made of resilient material and housing the said seat and extending transversely of the axis of the seat, a rigid carrier extending longitudinally of the casing within the latter and secured at its ends to the casing, a closure element mounted on the carrier opposite the said seat and normally held away from the seat by the resiliency of the casing, and means carried by the valve body for moving both ends of the casing simultaneously so as to flex the casing and move the carrier axially of the seat to cause the closure element to approach the seat.

5. A valve comprising a supporting member, a flexible tube secured intermediate of its ends to the supporting member, the ends of the tube being closed and the supporting member having a pair of ports opening into the bore of the tube, a stiff bar disposed in the tube longitudinal thereof and fastened at its ends to the ends of the tube, a closure element carried by the bar and disposed for closing one of the said ports, and means for moving the tube ends with respect to the supporting member so as to move the bar and the closure element with respect to the last named port.

6. A valve as per claim 5, in which the tube is resilient and in which the said means include a screw resisted as to movement in one direction by the resiliency of the tube.

7. A valve comprising a supporting member, a flexible tube secured intermediate of its ends to the supporting member, the ends of the tube being closed and the supporting member having a pair of ports opening into the bore of the tube, a stiff loop having a portion extending through the tube, a closure element carried by the portion of the loop within the tube and disposed adjacent to one of the ports, and means associated with the part of the loop outside of the tube for moving the loop bodily towards the last named port.

8. A valve comprising a supporting member, a tube mounted thereon, the supporting member having a pair of ports opening into the bore of the tube, a carrier housed by the tube and fastened to the ends of the tube, and a closure member carried by the carrier and disposed adjacent to one of the ports, the tube being flattened between the said ends and the opening of the ports into the same to permit a flexing of the tube for moving the carrier so as to vary the distance between the closure member and the port adjacent thereto.

9. In a valve, a supporting member, a tube mounted thereon intermediate of the ends of the tube, the supporting member having a port opening into the bore of the tube and the ends of the tube being closed, a carrier housed by the tube and fastened to the ends of the latter, and a closure member carried by the carrier and positioned adjacent to the said port, the portions of the tube between the ends thereof and the connection to the supporting member being flattened to permit the tube to be flexed so as to vary the distance from the said port to the carrier and the closure member.

10. In a valve, a supporting member, a tube mounted thereon intermediate of the ends of the tube, the supporting member having a port opening into the bore of the tube and the ends of the tube being closed, a carrier housed by the tube and fastened to the ends of the latter, and a closure member carried by the carrier and positioned adjacent to the said port, the portions of the tube between the ends thereof and the connection to the supporting member being flattened substantially parallel to the plane of the opening of the said port so as to permit the tube to be flexed to vary the distance from the said port to both the carrier and the closure member while keeping the closure member substantially parallel to the said plane.

11. A valve as per claim 10, in which the ends of the tube and carrier are symmetrically disposed with respect to the port and the closure member, in combination with means for simultaneously moving both ends of the tube to effect the said flexing.

12. A valve as per claim 10, in which the ends of the tube and carrier are symmetrically disposed with respect to the port and the closure member, in combination with a yoke disposed outside the tube and connecting the ends thereof, and a screw connecting the yoke with the support and arranged for moving the yoke to flex the tube symmetrically.

13. In a valve, an inner tube projecting beyond an outer tube, a hollow flexible member mounted on the outer tube transversely of the latter and having both tubes opening into the said member medially of the latter, closure means mounted within the flexible member and disposed adjacent to the mouth of the inner tube and movable with respect to the said mouth upon a flexing of the flexible member, and means for effecting such flexing.

14. In a valve, an inner tube projecting beyond an outer tube, a hollow flexible member mounted on the outer tube transversely of the latter and having both tubes opening into the said member medially of the latter, closure means mounted within the flexible member and disposed adjacent to the mouth of the inner tube and movable with respect to the said mouth upon a flexing of the flexible member and screw means coaxial with the inner tube and arranged for effecting such flexing.

15. In a valve, an inner tube projecting beyond an outer tube, a hollow flexible member mounted on the outer tube transversely of the latter and having both tubes opening into the said member medially of the latter, closure means mounted within the flexible member and disposed adjacent to the mouth of the inner tube and movable with respect to the said mouth upon a flexing of the flexible member, a bracket fast on the outer tube and overhanging the flexible member, and means threadedly connected to the bracket and operating coaxial with the inner tube for effecting such flexing.

16. An expansion valve comprising an inlet tube and an outlet tube of high thermal conductivity disposed within the inlet tube, and means for expanding compressed liquid as it passes from the inlet tube to the outlet tube, whereby the conduction of heat through the outlet tube will lower the temperature of the liquid before the latter is expanded.

17. A valve comprising a body having an inlet and an outlet port, a tubular casing closed at both ends and having a medial aperture alining with the inlet and outlet ports, one of the ports having its mouth in a plane parallel to the axis of the tubular casing, a movable closure for the last named port, a carrier for the said closure supported by the tube ends and extending parallel to the said plane, and means operating transversely of the said plane for flexing the casing to move the carrier with respect to the last named port.

18. A valve comprising a tubular casing closed at both ends, a hollow support substantially central of the casing and communicating with the bore of the casing through a pair of ports, a carrier bar supported by the casing substantially axial of the latter and extending at right angles to one of the said ports, a closure member carried by the said bar and disposed parallel to the last named port, and means outside the casing and operating in substantial alinement with the said port for flexing the casing so as to move the closure member toward the said port while maintaining the same parallel to the said port.

Signed at Chicago, Illinois, May 13th, 1921.

CHARLES C. HANSON.
JOHN TWARDOWSKY.